United States Patent [19]

Weber

[11] 4,439,734
[45] Mar. 27, 1984

[54] METAL OBJECT LOCATOR INCLUDING FREQUENCY SHIFT DETECTOR

[76] Inventor: Harold J. Weber, 20 Whitney Dr., Sherborn, Mass. 01770

[21] Appl. No.: 162,080

[22] Filed: Jun. 23, 1980

[51] Int. Cl.³ .......................... G01V 3/11; H03L 7/00
[52] U.S. Cl. .................................. 324/327; 331/1 R; 331/65
[58] Field of Search ................ 324/236, 237, 326–328, 324/233, 67; 331/65, 1 R, 1 A, 18, 36 R, 36 C; 340/38 L

[56] References Cited

U.S. PATENT DOCUMENTS

| 3,373,374 | 3/1968 | Marosi | 324/234 X |
| 3,875,525 | 4/1975 | Ballinger et al. | 340/38 L X |
| 4,096,432 | 6/1978 | Spencer | 324/233 X |
| 4,112,349 | 9/1978 | Weber | 324/326 |
| 4,130,792 | 12/1978 | Sullivan | 324/327 |
| 4,196,391 | 4/1980 | Weber | 324/328 |
| 4,263,552 | 4/1981 | Weber | 324/326 |
| 4,263,553 | 4/1981 | Cook et al. | 324/327 |

OTHER PUBLICATIONS

Dayton et al., "Capacitive Micrometer," *Electronics*, Sep. 1946, pp. 106–111.
Todd, Carl David, "Metal Detector Finds Ducts and Pipes," *Electronics*, Jan. 1, 1957, pp. 172–174.

*Primary Examiner*—Gerard R. Strecker

[57] ABSTRACT

A frequency shift responsive metal detector having a sense oscillator coupled with an inducer loop. When the inducer nears a metal object, the effective inductance is changed which correspondingly shifts the natural frequency of the sense oscillator. The sense oscillator couples with a frequency shift detector. The detector produces a d.c. feedback signal which is proportional to the sense oscillator shift and acts therewith to re-establish the oscillator to it's original natural frequency by way of a voltage controlled reactance. The detector also produces a d.c. output that serves to drive an audio frequency rate voltage controlled oscillator wherein the pitch, or resultant frequency therefrom produced is proportional to the effect of the metal object on the inducer loop. A d.c. signal from the detector also serves to drive a visual indicator, such as a meter. The change in the loop inductance may be either positive or negative, resulting in a unique indication distinction between diamagnetic materials, and those which are ferromagnetic or paramagnetic. The use of a dual channel, stereo-like apparatus also provides the operator with directivity, which may be coupled with an enhancement gate signal which alternates the stereo-response back and forth between the earphones of a stereo-headset, thereby improving operator acuity.

18 Claims, 8 Drawing Figures

METAL OBJECT LOCATOR INCLUDING FREQUENCY SHIFT DETECTOR

BACKGROUND OF INVENTION

The instant invention teaches the use of a sense oscillator in conjunction with a loop antenna. When a metal object or the like enters the normal loop field, the effective inductive reactance will be changed. The result is the oscillator frequency changes in proportion to the object's effect on the loop's electromagnetic field lines.

The use of such a sense oscillator arrangement, resulting in a change in oscillator frequency is well known as a beat frequency oscillator (BFO) metal detector and is particularly taught in U.S. Pat. No. 2,442,805 by Gilson entitled "Metal Locator", and more recently in U.S. Pat. No. 4,196,391 by Weber entitled "Metal Locator with Stereotonic Indication of Translateral Position". In each of these prior inventions, the sense oscillator output signal is heterodyned with a separate beat oscillator. The result is a difference frequency which varies at an audio rate equal to the change in hertz of the sense oscillator frequency produced by the obscured object. The effective rate of change may be increased: doubled, or tripled at least, through the expedient of harmonic mixing, e.g. having a second or higher order harmonic of the sense oscillator heterodyning with a higher frequency beat oscillator. Such an enhancement scheme is taught by Speaker in U.S. Pat. No. 2,393,717 entitled "Electronic Surgical Metal Body Locator", as well as more recently by Weber in U.S. Pat. No. 4,255,710 entitled "Directional Metal Detector Apparatus Having Enhanced Sensitivity". Each of these prior teachings provide a good increase in sensitivity over what fundamental frequency mixing produces.

The sensitivity limitations of this prior art is overcome by the instant invention, while still retaining most of the intrinsic advantages of the BFO class of metal detectors. The sense oscillator and inducer loop antenna coact to produce a frequency change in the sense oscillator output in a manner virtually the same as with any ordinary BFO metal detector. Therefore, the interactive effect between the sense oscillator is well established through long experience. The important advance wrought by this invention occurs after the sense oscillator frequency pertubations are produced. No beat frequency oscillator is used. This eliminates the instability, e.g. drift, etc., inherent in the usual beat oscillator. Frequency "pulling" between the sense oscillator and a beat oscillator, especially when near zero beat, is eliminated. Most importantly, the intrinsic limitation that the audio beat frequency note change rate is proportional to the relationship between the sense and beat oscillator is no longer a limiting sensitivity factor.

The instant invention uses a frequency shift detector to develop an automatic frequency control signal which reacts to any change in the sense oscillator frequency. The result is an error signal which can be amplified to any reasonable extent, then used to control the rate of a voltage controlled oscillator operating at an audio rate. The result, due to the possible amplification factors involved, is a rate of apparent output pitch change which is much more exagerated than what the change in sense oscillator rate may alone produce.

Therefore it is a purpose of the invention to provide a metal detector having a sense oscillator coupled with an inducer loop.

Another purpose of the invention is to provide a detector responsive to any frequency shift produced in the sense oscillator by presence of metal near the loop antenna, with the detector producing an error signal therefrom which is proportional to the shift.

Yet another intent is to provide a metal detector having enhanced sensitivity.

The invention's essence rests in the coaction of a sense oscillator frequency pertubations with a frequency shift detector so as to produce an error signal which serves to control rate of an audio frequency voltage controlled oscillator resulting in an aural output indication therefrom.

Still another point is to provide a directional, stereoresponsive metal detector providing "right" and "left" sense.

Given these teachings, the invention provides a sensitive metal detector suited for locating hidden objects, treasures, pipes, cables, weapons, shrapnel, and a variety of other such items.

Furthermore, the metal detector can be operated to serve to discriminate between materials having different magnetic properties.

SUMMARY

The invention employs at least one sense oscillator, coupled with an inducer loop antenna. The sense oscillator is established to have a maximum of frequency dependence upon the inducer inductance. The result is that an even small change in the electromagnetic field lines extending therefrom will produce a goodly shift in the sense oscillator natural frequency.

The sense oscillator also responds to metal objects of different compositions in a distinct way. Diamagnetic materials tend to reduce the loop inductance, raising the oscillator frequency. Otherwise, ferromagnetic and paramagnetic materials act to generally increase the loop's effective inductance, lowering the oscillator frequency. Therefore, a discrimination between the properties of various metal objects is achieved.

The variant first frequency output from the sense oscillator couples to a frequency shift detector. The frequency shift detector acts to produce a bipolar direct current (d.c.) signal at its output the value of which changes in accord with the frequency shift changes in the sense oscillator. In the instant teachings, an automatic frequency control integrated circuit element is adapted to this function. One of the d.c. output signal functions is to provide a.f.c. feedback to an oscillator control element, such as a voltage variable capacitor (varactor diode) which re-establishes the sense oscillator near to its original frequency even in the presence of an object. This a.f.c. feedback acts to increase the apparent dynamic range of the detector, although the detector function may also be employed without the a.f.c. actually feeding back to reset the first frequency. Another d.c. output signal function is to provide an error voltage signal which is amplified and coupled with a voltage controlled oscillator. This v.c.o. function is usually at an audio rate, coupled with a headphone or loudspeaker by way of an amplifier. The result is the audio pitch produced by the v.c.o. will change in proportion to the error voltage signal derived from the frequency shift detector.

The further adaptation of this teaching is also shown to provide stereo-like, directional indication to the operator. Two separate "right" and "left" channels are therefor used, each including a separate sense oscillator, frequency shift detector, and other circuit functions. The loop antennae arrangement is set-up to place each loop in a position to distinctly act in a different way on the covert metal object. Usually the loops are arranged side-by-side, with the coils comprising the loop overlapping to such an extent that their mutual field coupling is nulled to a minimum.

The output signals from the two detector channels, usually in the form of two audio pitch signals, are coupled to the separate "right" and "left" earphones of a stereo headset worn by the operator.

Operation is such that, when the operator works the loop antennae to approach a metal object, the nearest first loop will initially produce the strongest response. If he overshoots the object, the other second loop will produce a stronger response, while the initial first loop response will diminish. When oriented directly over the object, both loops will produce strong, and equal, responses. Thus the operator is guided to "find" the object with less lost motion.

When a metal object is small, or buried deeply, the effect on the loop antennae can be small. Therefore the indication provided to the operator may be weak, even with relatively high "gain" between the sense oscillator and the operator's indicator. A very considerable improvement in recognizing these weak differences is believed to be provided by alternately switching between the right and left audio output (headset) signals. This is provided by the enhancement gate signal, which provides this alternant switching action at a slow, repetative rate on the order of a few hertz. The operator's ear mechanism has been observed to give better indication to smaller changes using this enhancement, over that indication which two steady tones serve to provide. Also, operator fatigue is thought to be reduced, because the effective sound level is cut in half together with the ease of recognition which reduces the usual effort required of the operator to achieve satisfactory results.

DESCRIPTION OF DRAWINGS

Six sheets of drawings including eight figures describe this invention.

DESCRIPTION OF INVENTION

The essence of this invention is the combination of a loop antenna means which produces electromagnetic field lines extending therefrom so as to be reactively influenced by any nearby metal object, a sense ("search") oscillator coupled with the loop antenna so that the loop inductance serves to strongly influence the natural resonant first frequency of the oscillator, and a frequency shift detector coupled to the oscillator and responsive with the frequency signal produced therefrom so as to provide a substantially unipolar, e.g. direct current, error signal the instantaneous absolute value of which is proportional to the difference between a predetermined reference frequency and the oscillcator's momentary first frequency rate. The utility of these essential elements is provided by coupling an indicant, say a galvanometer, or else a voltage controlled audio oscillator, with the unipolar error signal so as to translate the error signal value changes into a meaningful indication to an operator.

Figure 1:
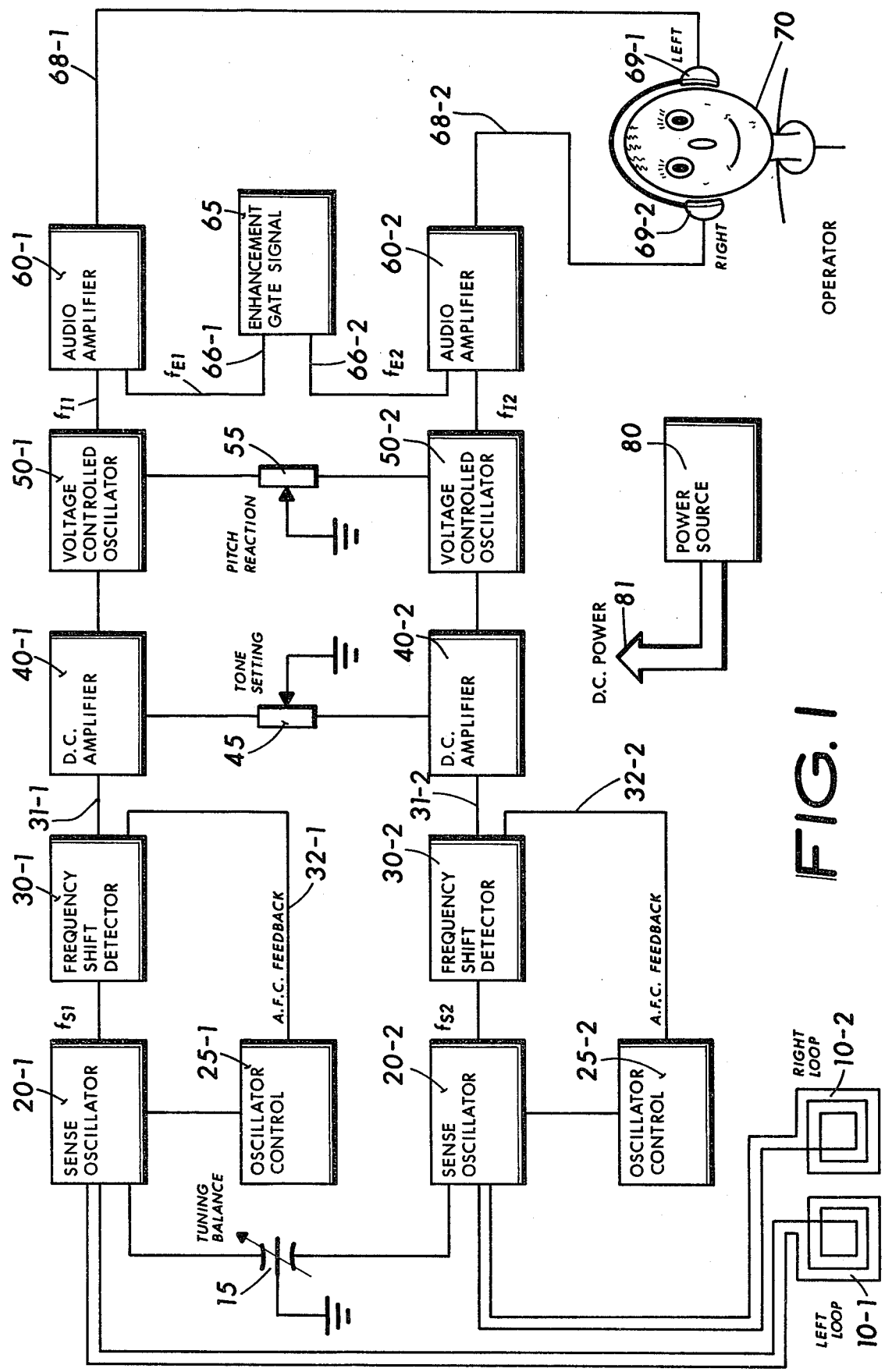
FIG. 1 Functional diagram for a stereotonic detector, showing the essential elements.

Further extension of the teaching is best shown in FIG. 1. A directional stereophonic like, e.g. stereotonic, metal detector is functionally depicted, which provides the operator with "right" and "left" direction sense in addition to proximity (e.g., nearness) indication. Two separate "channels" are provided: one "right", one "left". The left channel includes the left loop 10-1 coupled as the frequency determining inductive element for the sense oscillator 20-1. The sense oscillator couples to a frequency shift detector 30-1, producing a d.c. error signal 31-1 therefrom. This error signal varies in value in proportion to any influence brought to the loop 10-1 by an extraneous metal object. The error signal 31-1 couples with a d.c. amplifier 40-1 which acts to increase any apparent changes in the instantaneous error signal value. The d.c. amplifier output couples with the control input of a voltage controlled oscillator which is preferably operating in the audio frequency range, though not limited thereto. The v.c.o. output undergoes further audio amplification 60-1, producing an output 68-1 coupled to the "left" earphone 69-1 of the operator's headset.

In a like way the "right" loop 10-2 couples with the sense oscillator 20-2. The oscillator couples with the frequency shift detector 30-2, producing an error signal 31-2 which passes by way of amplifier 40-2 to a voltage controlled oscillator 50-2. The v.c.o. output signal, preferably at an audio frequency rate comparable with the "left channel", couples through an amplifier 60-2 producing a signal 68-2 which drives the "right" earphone 69-2 worn by operator 70.

The automatic frequency control (a.f.c.) feedback signals 32-1, 32-2 are coupled to the respective oscillator control elements 25-1, 25-2. These elements are usually a voltage controlled reactance, viz a varactor diode or the like, coupled with the sense oscillator's 20-1, 20-2 tuned circuits. The a.f.c. function is to "retune" the sense oscillator to its normal frequency, when the natural frequency is effectively shifted due to the presence of a metal object near the loop antennae.

A tuning balance element 15 is shown to allow the operator to ocassionally "balance" the two sense oscillator frequencies $f_{S1}$, $f_{S2}$. This is preferably a differential capacitor, or varactor diodes coupled with a potentiometer to provide a differential capacitor effect.

Other preferable adjustments include a "tone setting" 45 and "pitch reaction" 55. The tone setting serves to balance the produced tone $f_{f1}$, $f_{f2}$ from each channel, whilst the pitch reaction sets how much the tone will change overall.

An enhancement gate signal source 65 serves to produce two very low frequency, e.g. about one to five hertz, gate signals $f_{E1}$, $f_{E2}$ which are respectively coupled 66-1, 66-2 to the audio amplifiers 60-1, 60-2. The gate signals serve to alternate the outputs between line 68-1 and 68-2. The preferred effect is to enable the operator to first hear one channel signal, then the other, repeated ad infinitum by the gate signal action. The desirous result is to provide the operator with alternate comparison, increasing his acuity for differentiating between small differences in tone by "listening to one, then the other" of the comparative audio tone outputs.

A power source 80, say batteries for portable operation, provides d.c. power 81 to produce the various electric functions required in the different functional means.

Figure 2:
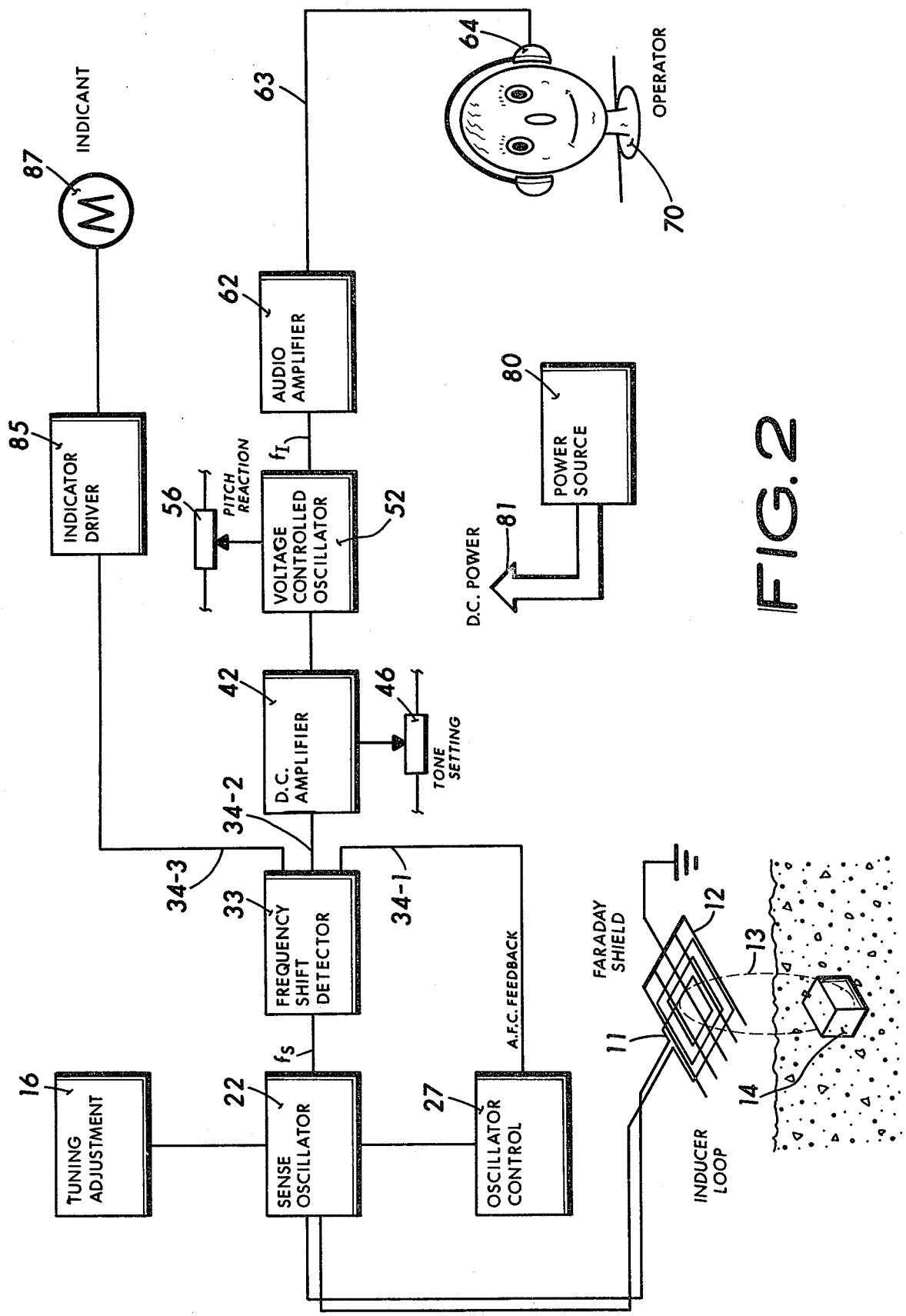
FIG. 2 Single channel version of the invention, also showing visual indicator.

A single channel, e.g. monotonic detector appears in FIG. 2. A loop antenna 11, including a Faraday shield 12 as a guard against stray capacity changes producing a "proximity effect" is shown. The field lines 13 impinge on the covert object, effecting a change in the loop's inductance. The loop forms part of the first frequency determining circuitry for the sense oscillator 22, resulting in a signal $f_s$ coupled to a frequency shift detector 33. The detector is shown to produce several outputs 34-1, 34-2, 34-3. The output 34-1 couples with the oscillator control 27, which acts to "correct" the frequency of sense oscillator when it shifts due to the influence of a metal object near the loop. The detector also produces an error signal which couples 34-2 to the d.c. amplifier 42. The gain of the amplifier increases the value of the control signal coupled with the v.c.o. 52. Therefore, the v.c.o. produces a preferably audio frequency rate output signal $f_f$ which changes in pitch in proportion to the error signal value. The audio signal is amplified 62, producing a signal 63 which couples to an earphone 64 worn by the operator 70.

Yet another output 34-3 couples with the indicant driver 85, usually a d.c. buffer amplifier. The driver couples with a galvanometer 87 to give visual indication to the operator.

Figure 3:
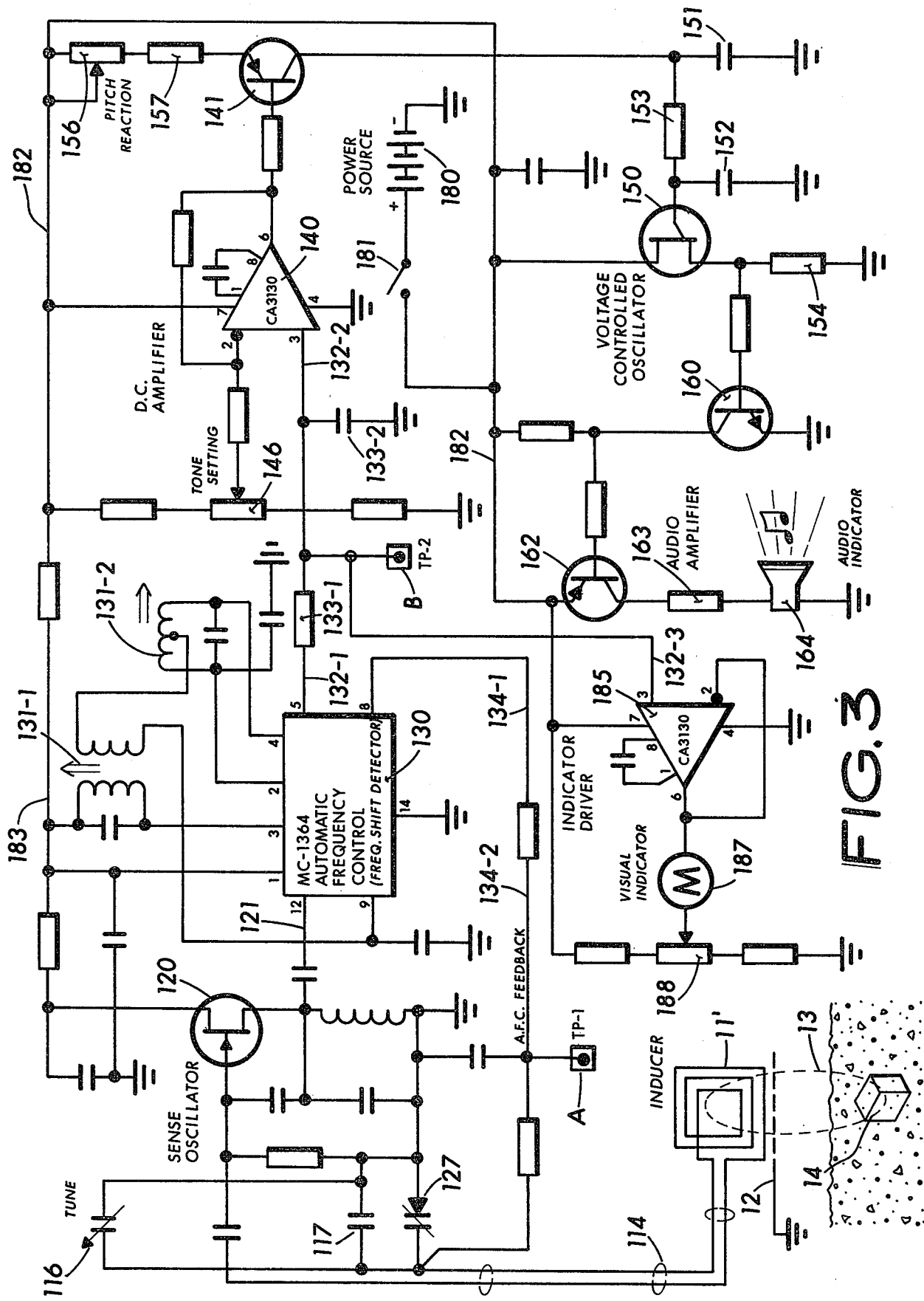
FIG. 3 Electrical diagram for a preferred embodiment for a monotonic detector.

The circuit for a preferred embodiment for the monotonic, one channel apparatus appears in FIG. 3. The inducer loop 11' is usually mounted on one end of a short staff, whilst the rest of the circuitry is mounted on the other end of the staff in a suitable protective enclosure, usually including a handle so that it may be carried about by the operator. This overall arrangement makes for a unit which is easy for the carry, while keeping the essential loop near the ground, etc. Connection of the loop is by shielded leads 114. A field effect transistor 120 couples therewith by the usual circuit means comprising a Clapp oscillator, or equivalent. The capacitive reactances 116, 117, 127 are included as the essential elements of the tuned circuit associated with the oscillator, together with the inducer loop inductance. In this embodiment, nominal resonance is 289 kilohertz, although any other first frequency between about 50 kilohertz and several megahertz may serve. Usually the frequency is selected for the intended application of the apparatus: 289 KHz is of course excellent for a goodly variety of such applications. The operator's tuning adjustment is accomplished by capacitor 116. Voltage variable capacitor 127 is part of the automatic frequency control function. The oscillator output 121 couples to the frequency shift detector function 130. A Motorola MC-1364P, or Radio Corporation of Amercia CA-3064 integrated circuit is preferred in this function. Although intended as the automatic frequency control element for commercial television tuner control, the adaptation of the integrated circuit to this unique application is appropriate. The Motorola "Semiconductor Data Library" Series A, Vol. VI characterizes the MC1364P operation. The curve FIG. 2 of the Motorola publication shows the signal swings produced on pins 5 and 8. As the oscillator frequency shifts downward due to the influence of a metal object, the voltage on pin 5 decreases from about 11 volts to about 2 volts (for maximum oscillator "shift"). Pin 8 output increases a like amount, producing a higher voltage across varactor 127, thereby decreasing the varactor capacitance, attempting thereby to slew the oscillator frequency higher to compensate for the decrease in frequency produced by the nearby influence of an object. The tuned transformers 131-1, 131-2 are predetermined to be resonant at a selected second frequency and form part of the detector function and as such should have good radio frequency quality, e.g. "Q" factor for best performance. The error signal produced at the output terminals 132-1, 134-1 of the detector 130 is derived through off resonance slope detecting the effective amplitude change of the first signal due to lessened off peak response, as wrought by a change in frequency thereof when coupled through the tuned coupling devices comprising transformers 131-1, 131-2 which are maintained at a fixed second frequency operating resonance. The invention has been modelled using modified "intermediate frequency" transformers of the type commonly used around 455 kilohertz in medium wave broadcast band radios. The MC1364P requires two resonant transformers for proper operation, as taught in FIG. 1 of the reference. The overall "Q" and detector performance can still further be improved by combining the shown tuned network with more second frequency resonant poles as attained by additional tuned coils. This extension serves to maximize the circuit's sensitivity to smaller deviations in the sense oscillator first frequency brought about by smaller, or more distant objects 14 in the inducer's field 13. Furthermore, a known crystal or mechanical filter or the equivalent may be combined with the tuned circuits to still sharpen the second frequency reference response and enhance first frequency shift sensitivity. The detector 130 output signal 132-1 in FIG. 3 is a variant d.c. value proportional to the frequency change present at the input 121. A similar output signal appears on output 134-1 of opposite polar sense which is filtered to produce the a.f.c. feedback signal 134-2. This signal couples across the varactor diode 127 and is of such a sense that the diode 127 capacitance will change to such an extent as to nearly cancel any oscillator first frequency change. The other output 132-1 couples through the r.f. filtering elements 133-1, 133-2 to the signal input of d.c. operational amplifier 140. This amplifier combines the signal with a voltage derived from the "tone setting" potentiometer 146 to produce an output coupled to PNP transistor 141 including resistors 156, 157 connected as a constant current driver to charge integration capacitor 151 and the timing capacitor 152 through resistor 153 which forms the repetition rate determining elements for an oscillator including unijunction transistor 150. The result is a voltage controlled oscillator which operates in the audio frequency range, developing an audio rate pulse signal across resistor 154. This audio pulse signal couples through NPN transistor 160 and PNP transistor 162 to a loudspeaker or headphone 164. A resistor 163 limits the current and acts to set the volume.

The detector output is also coupled as a signal 132-3 to the input of the indicant driver operational amplifier 185, say a CA-3130 integrated circuit. A meter 187 is connected between the amplifier output and the arm of a potentiometer 188, in a bridge arrangement. The result is a negative as well as positive movement of the meter indicator needle, depending on whether the sense oscillator shifts "up" or "down". The differing indication can serve to discriminate between diamagnetic, paramagnetic, and ferromagnetic materials with good accuracy. For portable operation, a battery 180 connects power through a switch 181 to the power bus 182. The power value on line 183 is zener regulated by means integral with the integrated circuit 130, acting as a stable power source for the oscillator device 120.

Figure 4:
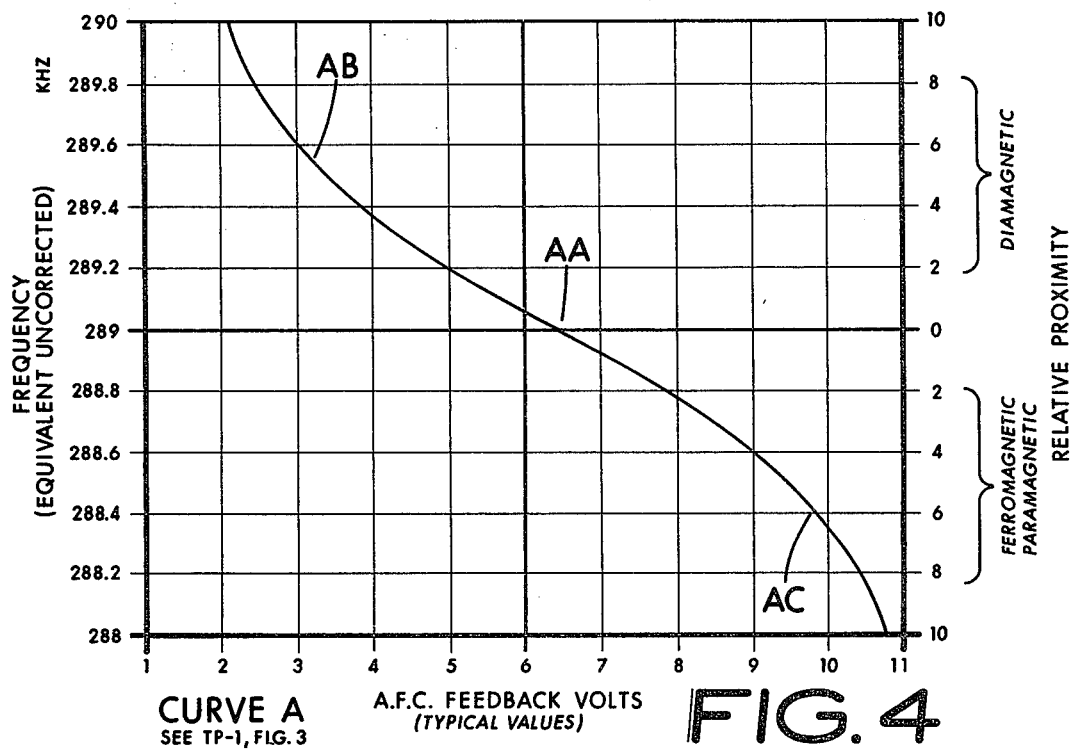
FIG. 4 Transfer curve showing frequency shift detector action.

A transfer curve for the frequency shift detector output signal appearing on test poing TP-1 in FIG. 3 is shown in FIG. 4. This curve is centered around 289 KHz, with the a.f.c. voltage about +6.4 volts d.c. nominal, see plot AA. When the frequency shifts "up" AB as may be produced by the presence of a diamagnetic material, the output voltage shifts "down" AB. This is clearly shown on the curve relative to the "equivalent uncorrected" frequency (i.e., if no a.f.c. is included) and is measurable with the a.f.c. feedback disabled. In a like way, a ferromagnetic or paramagnetic material tends to shift the oscillator frequency "down" AC, resulting in an increase of the a.f.c. feedback voltage value. With the a.f.c. feedback enabled, the curve changes, with the frequency staying nearly constant, although the a.f.c. feedback voltage will change just as much.

Figure 5:
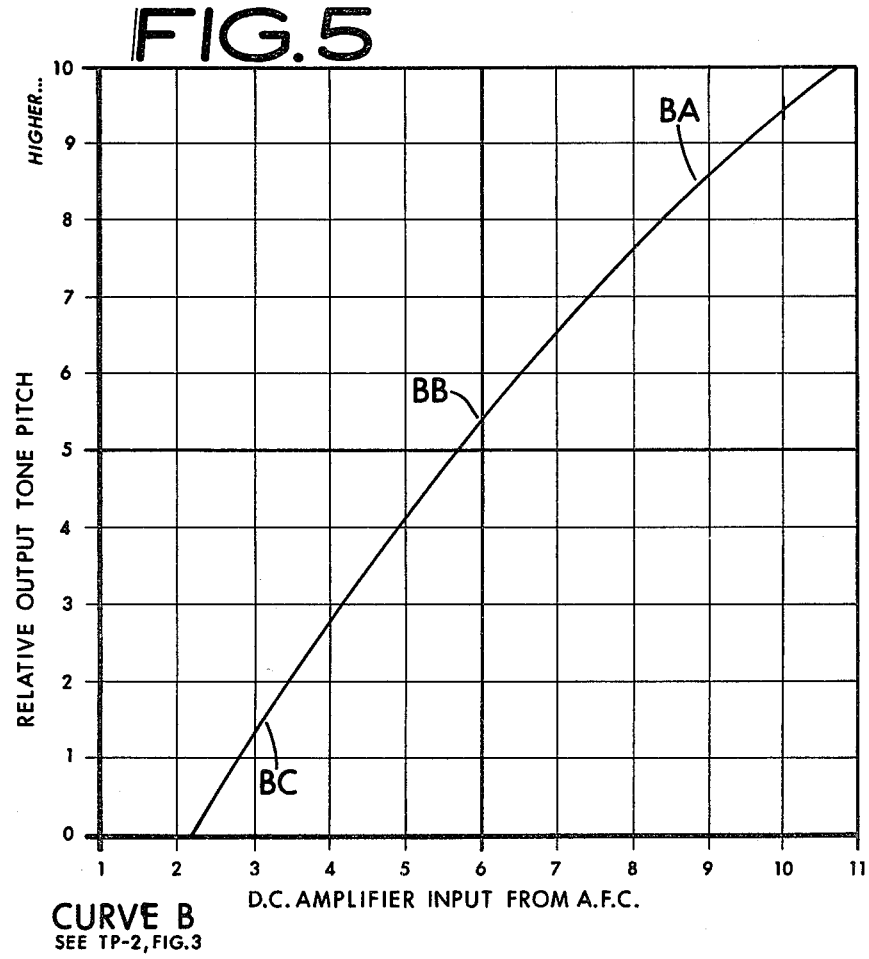
FIG. 5 Plot showing output tonal pitch changes relative to detector error signal outputs.

Test point TP-2 in FIG. 3 provides the measurement curve depicted in FIG. 5. This curve shows the change in tone pitch with d.c. amplifier input variation. The nominal input BB produces a nominal tone, whilst a d.c. input increase will act to increase the tone pitch BA, or else a d.c. input decrease will decrease the tone pitch BC. The result is a portamento sound effect in the operator's earphones.

Figure 6:
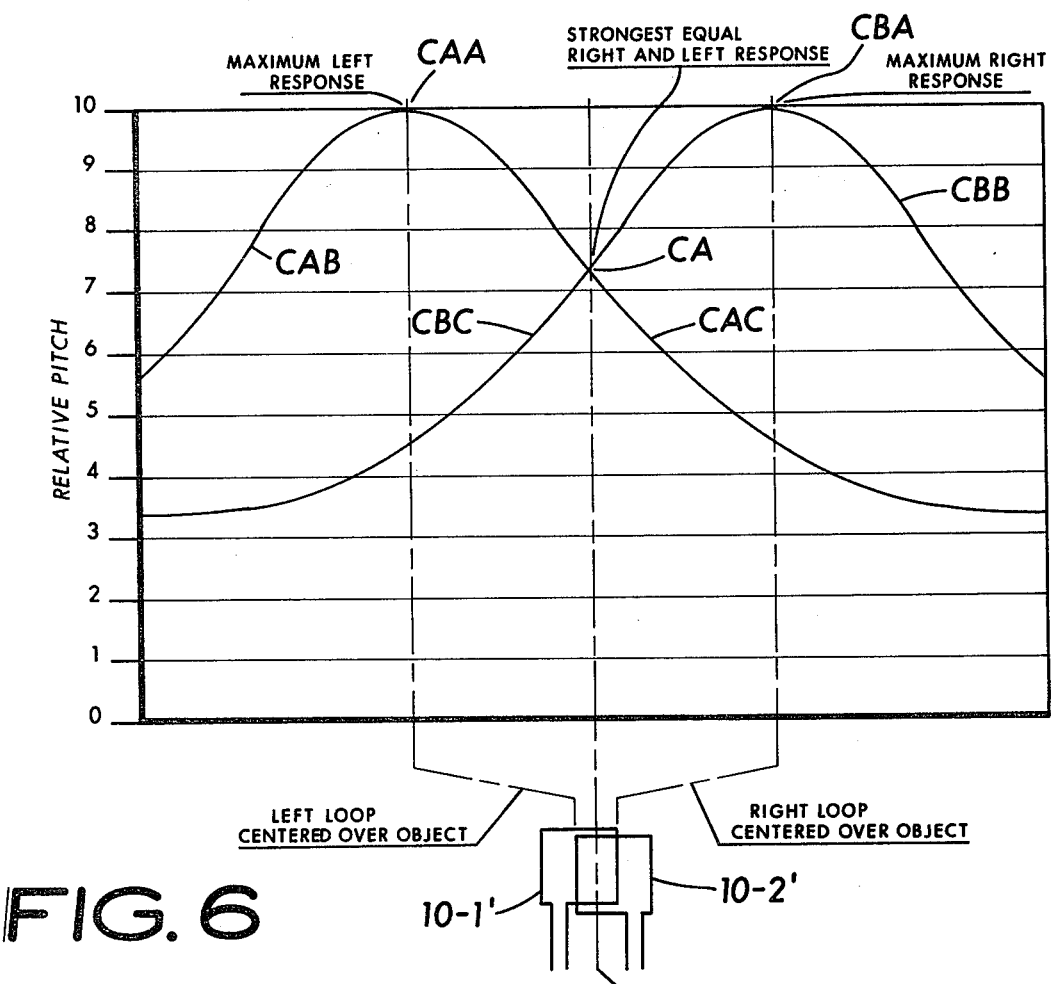
FIG. 6 Response curve showing stereotonic response reaction for various inducer loop locations.

The duplication of a second channel in accord with the teachings of FIG. 1 and FIG. 3 is an ordinary extension of the novelty of this invention. The use of two loop antennae elements for searching for a covert object produces the resulting effects depicted in the curves of FIG. 6. When the two loops 10-1′, 10-2′ are uniformly positioned over the object, the audio pitch produced by the two stereotonic outputs will be equal, although not maximum, depicted by the crossover point CA on the curve plots. When the operator moves the loop antennae so that the LEFT loop 10-1′ is positioned most proximate with the object, the LEFT output will increase to a MAXIMUM value CAA, whilst the RIGHT output CBC will decrease. If the loops are moved yet further LEFT, the left output CAB will decrease, and the right output CBC will diminish further. Conversely if the RIGHT loop 10-2′ is positioned directly over the object, the RIGHT output will increase to a MAXIMUM CBA, whilst the LEFT output CAC will decrease. If the loops are moved yet further RIGHT, the right output CBB will decrease, and the left output CBC will diminish further. Thus the non-symmetry of pitch change gives improved directional indication effect to the operator, improving the acuity of the locating function. Furthermore this shows that when the two tone signals are at an equal maximum, the loop antennae are directly over the hidden object. The use of a Faraday type shield is preferred, to help prevent errors brought about through electrostatic capacity variation commonly known as the proximity effect.

Figure 7:
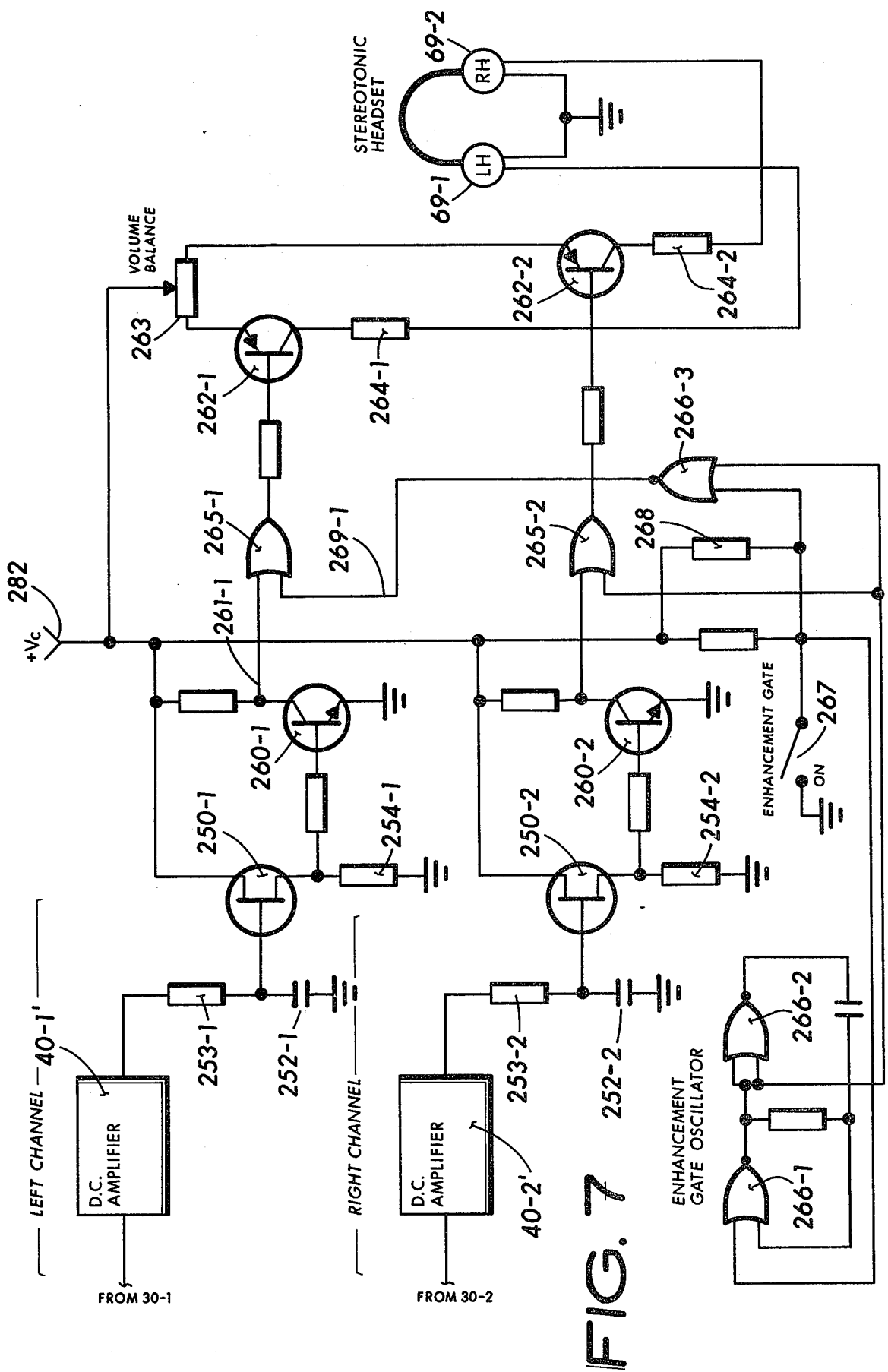
FIG. 7 Electrical diagram for the enhancement gate signal adaptation.

A further improvement in resolving minor tonal differences between the stereotonic channels may be had through the improvement taught in FIG. 7. Substantial improvement in the operator's resolution of very small differences in pitch can be had by alternately listening to one at a time, e.g. to listen first to the "right" tone, then the "left" tone, in rapid-fire succession, then repeat ad infinitum. When the tones match, the effect will be that of a "steady" tone, while when they are mismatched the result will be a distinct "beep-boop" type of sound. This is like the effect of "tick-tock" in a clockworks, where the sound difference is noticable, albeit slight. In FIG. 7 the attendant d.c. amplifiers 40-1′, 40-2′ of FIG. 1 serve to output their respective signals, as shown for one channel in FIG. 2, to the respective bases of unijunction transistors 250-1, 250-2 through the timing resistances 253-1, 253-2 and capacitors 252-1, 252-2. The transistors produce audio rate pulses across resistors 254-1, 254-2 which correspond with the "left" and "right" channel, respectively. Two amplifier transistors 260-1, 260-2 amplify the pulses which couple to an input of the respective OR logic gates 265-1, 265-2. The enhancement gate signal is produced by an astable multivibrator including NOR logic elements 266-1, 266-2. One input of gate 266-1 also couples with the juncture of switch 267 and resistor 268. When the switch is OPEN, the resistor 268 pulls the gate input HIGH disabling the multivibrator and producing a steady LOW logic level at the output thereof. This LOW signal 269-1 enables gate 265-1 to pass any audio pulses 261-1 present on the other gate input, pulling the gate 265-1 output LOW in accord with these pulses and coupling to PNP transistor 262-1 which drives the left earphone 69-1 through volume limiting resistor 264-1. Also when the switch 267 is OPEN, the coupled input to NOR gate 266-3 is HIGH, resulting in a steady LOW on the output thereof, producing signal 269-2 coupled to an input of OR gate 265-2. This allows any audio pulses 261-2 to pass on to transistor 262-2 and thus to the right earphone 69-2 through volume limiting resistor 264-2. The potentiometer 263 permits balance of the volume level between the two earphones, giving allowance thereby for any differences in the operator's individual ear sensitivities. When the switch 267 is closed, the multivibrator will oscillate, on the order of several hertz, producing an output 269-1 from gate 266-1 which directly couples to gate 265-1 and is inverted by gate 266-3 before coupling to gate 265-2. The resulting effect is gate 265-1 and 265-2 will be alternately enabled, producing the desired back-and-forth enhancement effect.

Figure 8:
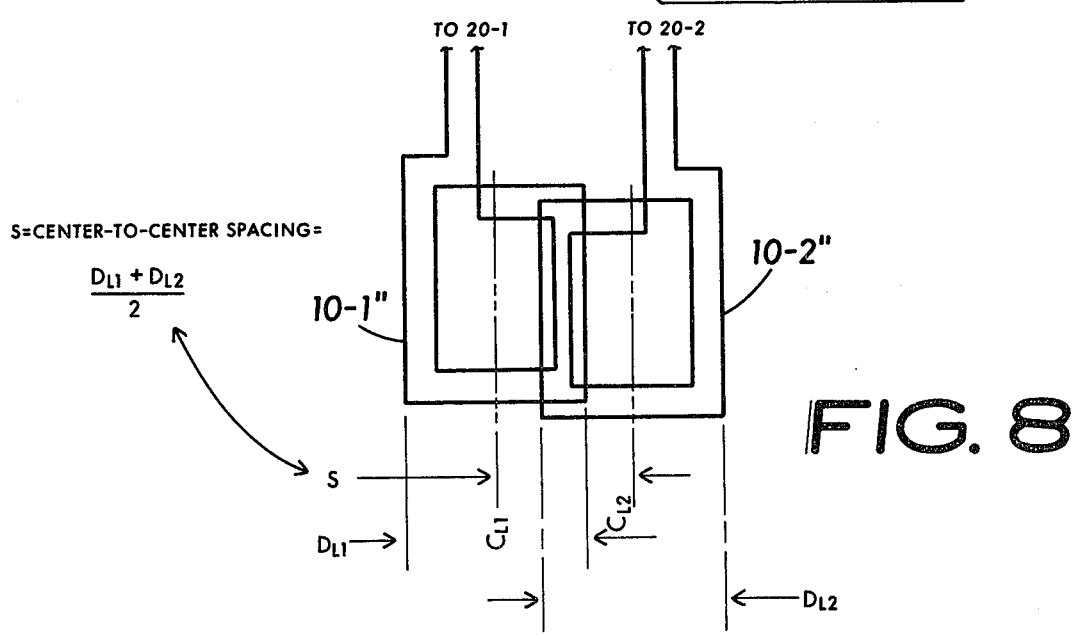
FIG. 8 Positioning detail for the preferred dual loop antennae orientation.

The preferable arrangement of the left loop 10-1″ and the right loop 10-2″ appears in FIG. 8. The loops are shown to overlap, which produces a null of electrical coupling therebetween. The loops are usually planar, e.g. flat wound coils of generally square or round shape. Dimension $D_{L1}$ represents the effective "diameter" for coil 10-1″, whilst $D_{L2}$ is that for coil 10-2″. The null arrangement is usually achieved when the center line $C_{L1}$, $C_{L2}$ of the respective coils is spaced about:

$$S = C_{L1} \text{ to } C_{L2} \text{ spacing} \approx \frac{D_{L1} + D_{L2}}{2}.$$

More usual practice is to position the coils so that an a.c. signal fed into one will produce a minimum output, e.g. null, at the other coil's terminals. In addition, a Faraday shield between the coils is preferred, as is an overall Faraday shield between the combined loop elements and any external object. This minimizes the "proximity effect" wrought by capacitance variations between the coils and any nearby object, other than the sought object.

Therefore the invention describes a high sensitivity metal detector having a sense, e.g. search, coil coupled with an oscillator. The presence of a metal object causes the frequency to change, producing a signal which couples to a frequency shift detector to produce an error signal therefrom which co-acts with an indicator means.

The use of other, even newer type, of frequency shift detector function is within the scope of the invention, for the essence is that there is a detector which responds to a shift in the sense oscillator frequency, and how it is implemented is not restrictive.

The apparatus is preferably embodied as a portable, hand held unit which is battery operated.

The apparatus may also be embodied as a part of, or supported by, a vehicle, vessel, or flying machine.

While particular integrated circuit detail is described in the preferred embodiment, any circuit form suited to satisfy the operational requirements may be utilized, yet retaining the invention's essence.

What is claimed is:

1. A metal detector apparatus, including in combination:
   a. inducer means effective for producing an extensive electromagnetic field couplable with a metal object;
   b. sense oscillator means having a first frequency determining means effectively coupled with said inducer means whereby a first signal is produced thereby having an instant frequency variably determined in part by the change in reactance of the inducer means wrought by the presence of the metal object;
   c. frequency shift detector means coupled with said sense oscillator means, effective for receiving a said first signal produced therefrom and coupling same through a frequency responsive detector means including a tuned element means which is maintained resonant near a predetermined second frequency value; wherefrom an error signal is produced having a first level error signal when said first frequency and said second frequency are about the same, and a different second level error signal which is variously proportional to the magnitude of any variation of the said first frequency relative with the said second frequency as bounded by the difference between the resonant and off resonance responses substantially determined by the effective "Q" factor of the second frequency tuned element means;
   d. frequency control means coupled with said sense oscillator means and said frequency shift detector means and effective in combination with said error signal to continuously retune said first frequency signal determining means to decrease the magnitude of any proportional difference between the said first and second frequency signals shown by the relative increase of any effective difference between the error signal first and second levels;
   e. indicant means coupled with said error signal effective to produce a telltale signal proportional to the instant error signal level; and,
   f. source of d.c. power coupled at least with said several means comprising the apparatus for the operation thereof.

2. Apparatus of claim 1 including an oscillator control means coupled with said sense oscillator means, having an input effectively coupled with said error signal, operative in response thereto to maintain said oscillator first frequency about constant even when said inducer means is influenced by a metal object.

3. Apparatus of claim 1 whereby said indicant means effectively includes a voltage controlled oscillator means with the control input thereto coupled with the said error signal, producing a variable frequency output therefrom which is about proportional in periodicity rate relative to the error signal value.

4. Apparatus of claim 3 whereby said variable frequency output is substantially an audio frequency rate, effectively coupled with an operator by way of an acoustical transducer means.

5. Apparatus of claim 3 whereby an amplifier means is effectively coupled between said error signal and said voltage controlled oscillator, producing therewith an increase in the reaction sensitivity of the said controlled oscillator periodicity rate changes relative to error signal value changes.

6. Apparatus of claim 1 whereby said indicant means is a galvanometer means effectively coupled by way of an indicator driver means with the said error signal.

7. Apparatus of claim 2 whereby said oscillator control means includes a voltage variable reactance means comprising part of the said first frequency signal determining means.

8. Apparatus of claim 1 adapted to directional indication, including in combination:
   a. inducer means including at least two separate acting inducer elements;
   b. sense oscillator means providing at least two substantially separate oscillator functions, each having their respective first frequency signal determining means effectively coupled with a separate said inducer element;
   c. frequency shift detector means coupled with said sense oscillator means, effective for separately receiving each first frequency signal produced therefrom and coupling same through tuned element means which are maintained resonant near a predetermined second frequency value; wherefrom an effectively separate error signal is produced for at least each received first signal that has a first error signal level when the respective said first and second frequency are about the same, and a different second error signal level which is variously proportional to the magnitude of any differences between the respecitive said first and second frequencies;
   d. frequency control means coupled with each said sense oscillator means and each respective said detector means, effective to retune the first frequency determining means to decrease the magnitude of any proportional difference between each respective combination of said first and second frequency signals shown by the relative increase of any effective difference between the corresponding first and second error signal levels; and,
   e. plural indicant means coupled with said detector means, with each indicant effectively responsive to a separate error signal produced therefrom.

9. Apparatus of claim 8 whereby said plural indicant means includes at least two separate acting voltage controlled oscillator means, with each of the individual control inputs thereto effectively coupled with a separate said error signal, producing therefrom a plurality of variable frequency outputs each of which is substantially proportional in periodicity rate relative to the coupled said error signal value.

10. Apparatus of claim 9 whereby said plural variable frequency outputs are each substantially at an audio frequency rate, providing at least a "right" and a "left" channel signal which acts to produce a stereophonic effect when coupled with an operator's correspondent ears by way of a plural acoustical transducer means, the combined effect of which is to provide a directional sense of coordination between the operator and the said inducer means.

11. Apparatus of claim 9 whereby plural amplifier means are coupled between the said plural error signals and each of the individual control inputs of the said voltage controlled oscillator means, resulting in an increased reaction sensitivity for each of the said controlled oscillator periodicity rate changes relative to the respective error signal value change.

12. Apparatus of claim 10 whereby an enhancement gate signal means is provided, which includes a source of very low frequency oscillations, say about one to five hertz, effectively coupled with a plural audio amplifier means, coupled between the said plural variable frequency oscillator outputs and the said plural acoustical transducers, operative therewith to repetitively alternate the coupling of the said "right" and "left" channel signals to the operator's ears.

13. Apparatus of claim 8 whereby said inducer means comprises essentially two inducer elements acting as loop antennae oriented in proximate, offset axial relationship in about the same plane, providing separate field interaction with an object.

14. Apparatus of claim 13 whereby said inducer elements are juxtaposed in such relationship that the field coupling therebetween is at an electrical null.

15. Apparatus of claim 8 whereby said sense oscillator means includes two oscillator functions with the tuning balance therebetween accomplished by a differential capacitor effect.

16. Apparatus of claim 1 whereby said apparatus is essentially comprised of a portable short staff having the inducer means effectively affixed to one end thereof; whilst an enclosure including electrical circuits essential thereto is effectively affixed to the other end thereof.

17. Apparatus of claim 1 including an analog-to-digital converter (ADC) means effectively coupled with said error signal, producing therefrom a binary value signal couplable with a substantially separate digital control means.

18. Apparatus of claim 1 whereby said frequency shift detector means includes a monolithic automatic frequency control circuit, adapted to provide an error signal therefrom in response to any shift in the frequency of the sense oscillator means coupled thereto.

* * * * *